US010776660B2

(12) United States Patent
Newman

(10) Patent No.: US 10,776,660 B2
(45) Date of Patent: Sep. 15, 2020

(54) METHOD AND APPARATUS FOR CONTRAST ENHANCED PHOTOGRAPHY OF WIND TURBINE BLADES

(71) Applicant: General Electric Company, Schenectady, NY (US)

(72) Inventor: John W. Newman, Newtown Square, PA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/909,139

(22) Filed: Mar. 1, 2018

(65) Prior Publication Data
US 2019/0050679 A1   Feb. 14, 2019

Related U.S. Application Data

(63) Continuation of application No. 14/835,966, filed on Aug. 26, 2015, now abandoned.

(60) Provisional application No. 62/042,102, filed on Aug. 26, 2014.

(51) Int. Cl.
| | |
|---|---|
| *G06K 9/62* | (2006.01) |
| *F03D 17/00* | (2016.01) |
| *G06T 7/00* | (2017.01) |
| *G06T 7/62* | (2017.01) |
| *B60R 11/04* | (2006.01) |

(Continued)

(52) U.S. Cl.
CPC ............ *G06K 9/6215* (2013.01); *B60R 11/04* (2013.01); *F03D 17/00* (2016.05); *G06K 9/4661* (2013.01); *G06K 9/52* (2013.01); *G06T 7/001* (2013.01); *G06T 7/0004* (2013.01); *G06T 7/62* (2017.01); *F05B 2270/8041* (2013.01); *G06T 2207/20224* (2013.01); *G06T 2207/30164* (2013.01); *Y02E 10/726* (2013.01)

(58) Field of Classification Search
CPC .............................. G06K 9/6215; F03D 17/00
See application file for complete search history.

(56) References Cited

U.S. PATENT DOCUMENTS

| | | | |
|---|---|---|---|
| 2007/0034803 A1 | 2/2007 | Plant | |
| 2011/0095537 A1* | 4/2011 | Numajiri | F03D 7/0204 290/55 |

(Continued)

FOREIGN PATENT DOCUMENTS

| | | | | |
|---|---|---|---|---|
| EP | 2481924 A1 | 8/2012 | | |
| GB | 2427975 A | * | 1/2007 | ............. G01N 21/21 |

OTHER PUBLICATIONS

PCT ISR Corresponding to PCT/US201/5046946 dated Nov. 3, 2015.

*Primary Examiner* — Rowina J Cattungal
(74) *Attorney, Agent, or Firm* — Dority & Manning, P.A.

(57) ABSTRACT

A method and apparatus for inspecting utility scale wind turbine generator blades from the ground includes a digital camera and an adjustable polarizing filter on a stable platform. The camera is used to record multiple digital images with varying polarization angles using an artificial polarized or polarized solar illumination to produce images with the same or similar registration but different polarization angles, followed by image processing using subtraction or absolute difference routines to yield high resolution, high contrast images with reduced glare and excellent surface definition over the field of view.

20 Claims, 8 Drawing Sheets

(51) Int. Cl.
 G06K 9/46 (2006.01)
 G06K 9/52 (2006.01)

(56) References Cited

U.S. PATENT DOCUMENTS

| | | | |
|---|---|---|---|
| 2011/0205348 A1* | 8/2011 | Fritz | G01M 5/0016 348/61 |
| 2012/0076345 A1* | 3/2012 | Fritz | F03D 80/50 382/100 |
| 2012/0268602 A1 | 10/2012 | Hirai et al. | |
| 2013/0149145 A1* | 6/2013 | Shibata | F03D 80/40 416/1 |
| 2013/0307961 A1 | 11/2013 | Puigcorbe Punzano | |
| 2014/0293038 A1* | 10/2014 | Delmonico | H05B 45/20 348/82 |
| 2015/0159624 A1* | 6/2015 | Haahr | F03D 1/0658 416/205 |
| 2015/0219498 A1* | 8/2015 | Tillotson | G01J 4/04 348/144 |

* cited by examiner

METHOD AND APPARATUS FOR CONTRAST ENHANCED PHOTOGRAPHY OF WIND TURBINE BLADES

CROSS-REFERENCE TO RELATED APPLICATIONS

This application is a continuation application of U.S. patent application Ser. No. 14/835,966, filed Aug. 26, 2015, which claims the benefit of U.S. Provisional Patent Application No. 62/042,102, filed on Aug. 26, 2014, entitled "Method and Apparatus Contrast Enhanced Photography of Wind Turbine Blades," the entire contents of which are incorporated by reference herein.

INCORPORATIONS BY REFERENCE

Applicant hereby incorporates by reference, as if set forth fully herein, the entirety of the disclosures of U.S. patent application Ser. No. 13/731,085, filed Dec. 30, 2012, now U.S. Pat. No. 8,553,233, and having the title "Method and Apparatus for the Remote Nondestructive Evaluation of an Object," U.S. patent application Ser. No. 13/837,145, filed on Mar. 15, 2013, and having the title "Method and Apparatus for Monitoring Wind Turbine Blades During Operation," U.S. patent application Ser. No. 13/839,908, filed on Mar. 15, 2013, and having the title "System and Method for Ground Based Inspection of Wind Turbine Blades," U.S. patent application Ser. No. 13/840,470, filed on Mar. 15, 2013, and having the title "Nondestructive Acoustic Doppler Testing of Wind Turbine Blades from the Ground During Operation," and U.S. patent application Ser. No. 14/469,292, filed Aug. 26, 2014, and having the title "Method and Apparatus for Remote Feature Measurement in Distorted Images."

BACKGROUND OF THE INVENTION

This invention relates to a method and apparatus for remotely detecting surface features and anomalies on wind turbine blades in situ, in particular utilizing digital photographic imaging technology. The invention facilitates such inspections from the ground, on stationary operating wind turbine generators and has utility for remotely detecting propagating latent defects and existing damage on the surface of a wind turbine blade. This permits surface defects to be detected before they become too large for repair in situ, which provides significant economic advantages, as the cost of repairing the wind turbine blade in situ is typically 10% of the cost of replacing a blade.

Due to their large size, extensive surface area and complex shape, wind turbine blades are difficult to nondestructively inspect even within a fabrication or repair facility. Visual inspection cannot identify defects below the surface of the outer skin of the wind turbine blade, which typically is fabricated from a fiberglass material. Active thermography inspection techniques using heat are effective for near surface defects but can give false positives and false negatives due to variations in material thickness and surface emissivity.

Shearography with either thermal stress or during flexure testing of the blade in the factory can be used to detect fiberwaves in spar caps and other areas of the blade, but the technique is slow, expensive and is usually performed only if known issues are suspected. Angle beam ultrasonic techniques are very slow and may not work through thick carbon fiber spar caps.

As a result, blades are commonly installed on towers and put into service with a significant probability of latent manufacturing defects. Furthermore, composite blades are subject to extreme temperature variations. Entrapped water in blades can undergo freeze/thaw cycles, which can cause internal damage. Cyclic forces of gravity and varying forces from the wind acting on the blades as they rotate can cause fatigue damage or the propagation of latent defects over time while manufacturing process mistakes can lead to early blade failure. Defects can grow below the surface of a wind turbine blade to the point that by the time cracks and damage breach the surface and can be detected visually, the damage may not be repairable on tower.

Detecting progressive damage and propagating defects in wind turbine blades in situ is difficult for a number of different reasons. Inspectors using sky cranes or rope access are expensive, time consuming and put personnel in a very dangerous working environment. While on tower, close access allows inspectors to visually detect blade defects such as gel coat cracking, lightning damage, and blade erosion, which may be precursors to further degradation of the blade over time. Access to a wind turbine blade in situ with portable instruments for nondestructive testing also requires rope access or sky platforms and cranes. Blade and tower crawlers with nondestructive testing sensors for in situ inspection have been developed and tested, but they can be extremely expensive, slow to operate.

It is also common practice to use optical and digital photographic imaging of blades in an attempt to detect visible damage from the ground. Standard telephotography often has very low contrast, even with post image processing with current contrast enhancement software. Pixels may be saturated with glare or areas of the blade may be in shadows. The normalization of the histogram, a frequent image processing function, may not be effective in achieving the effect of uniform blade illumination, except in small areas of the blade in the images.

There accordingly exists a need for a fast, cost-effective inspection method and apparatus for wind turbine blades using digital imaging to detect latent and propagating damage, which includes a method and apparatus for precision measurement of features or anomalies and locating these on the target blade.

BRIEF SUMMARY OF THE INVENTION

Accordingly, it is an object of the invention to provide images and analysis of digital photographic images of turbine blade surfaces for fast, cost-effective surface inspection for wind turbine blades to detect latent and propagating damage early enough to allow on-tower repair before it becomes necessary to remove the wind turbine blade from the tower and repair it off-site or replace it with a new blade. The sizing and location of anomalies can be used to classify blade status to provide a useful definition of actions needed to maintain safe turbine operation.

In accordance with the embodiment described herein, a system for inspecting utility scale wind turbine generator blades from the ground for propagating subsurface anomalies during normal operation comprises a digital camera and an adjustable polarizing filter on a stable platform that is used to record multiple digital images with varying polarization angles during daylight hours. Images with the same or similar registration but different polarization angles are subsequently image processed using subtraction or absolute difference routines to yield high resolution, high contrast images with reduced glare and excellent surface definition over the field of view. Images of blades may be calibrated to determine the location, signal to noise ratio, size, or other quantitative measurements of anomalies, and such early detection may allow repair of the blade up tower instead of more costly replacement.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE SEVERAL VIEWS OF THE DRAWINGS

The following detailed description of preferred embodiments of the invention will be better understood when read in conjunction with the appended drawings. For the purpose of illustration, there are shown in the drawings embodiments which are presently preferred. It should be understood, however, that the invention is not limited to the precise arrangements and instrumentalities shown.

DETAILED DESCRIPTION OF THE INVENTION

Figure 1:
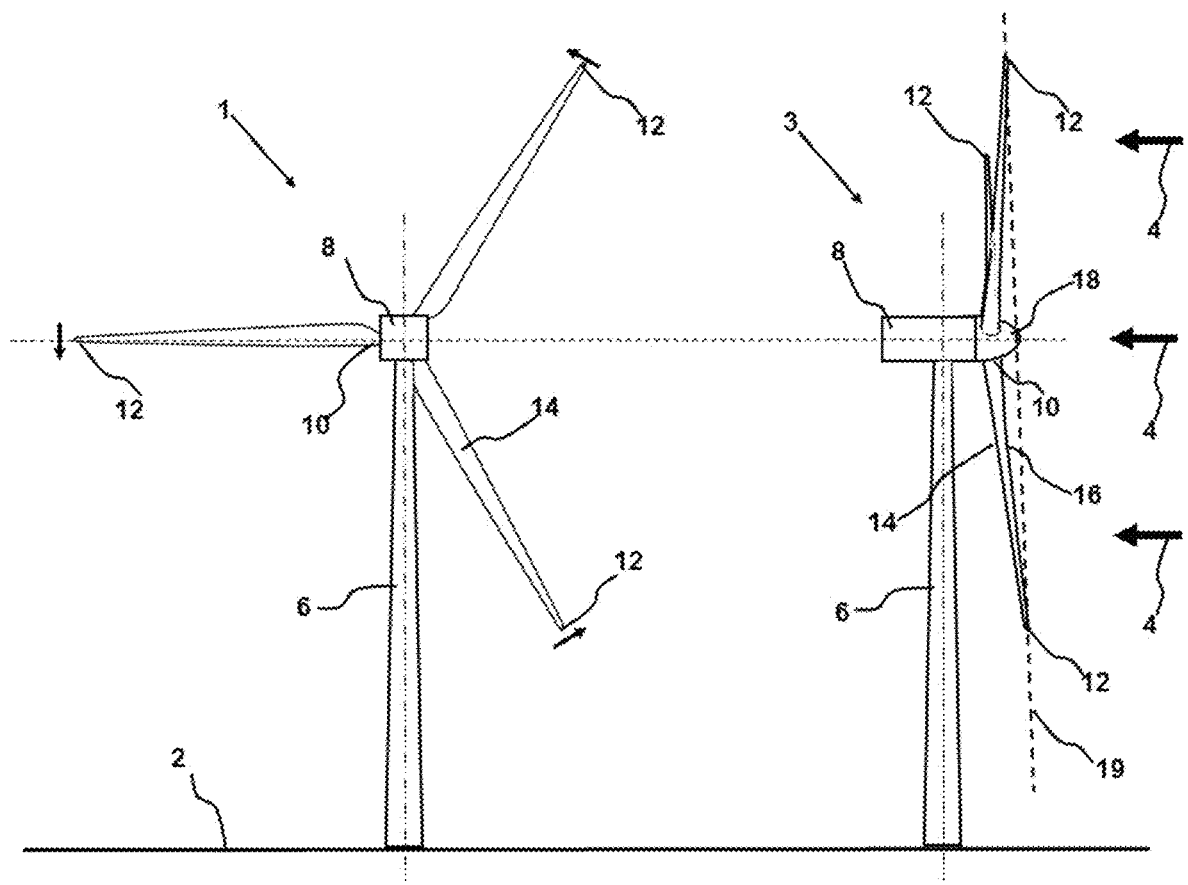
FIG. 1 is a schematic representation of a utility scale, horizontal axis, wind turbine generator.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

Referring now to the drawings, wherein like reference numerals indicate corresponding structure throughout the views, and referring in particular to FIG. 1, provided is a schematic diagram of a horizontal axis wind turbine (HAWT) that is typical of both land based and off-shore turbine generators. The view 1 from behind the turbine facing the wind includes tower 6 extending up from the ground or ocean surface 2 to support the nacelle 8 which contains the generator and gear reducers, unless it is a direct drive generator.

Figure 2:
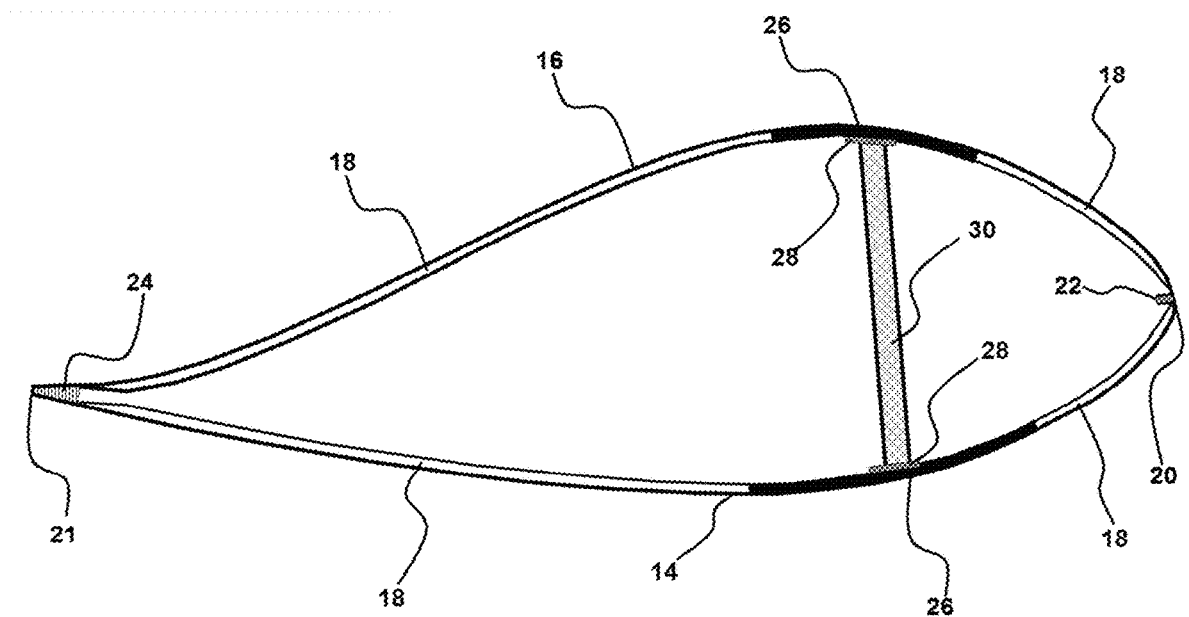
FIG. 2 is a schematic representation of a wind turbine blade cross section.

There are typically three blades on a utility scale wind turbine having root ends 10 and blade tips 21. As seen from the side view 2, the blade root ends attach to the rotatable hub 18. Blade side 16 facing the wind 4 is often referred to as the high pressure side. The blade side 14, facing away from the wind is referred to as the low pressure or suction side. As the blade speed increases the blade pitch is adjusted to the optimal angle of attack to the wind to create the maximum lift and torque required to drive the electricity generator. FIG. 2 shows the construction cross section of a typical HAWT blade. Wind turbine blades are generally manufactured with adhesively bonded composite shells forming the high pressure side 16 and the low pressure side 14. The trailing edge 21 is adhesively bonded, as is the leading edge 20, with adhesive bonding in some cases between two flanges 22 formed by the inner and outer fiberglass skins that make up sandwich panels 18. Two spar caps 26, which may be made from fiberglass or carbon fiber laminate, are bonded to the edges of the sandwich panels 18. The blade spar web 30 can be a solid fiberglass laminate or a sandwich construction with fiberglass or carbon fiber face sheets and a core material made with foam, balsa wood or other suitable material with high compressive strength. The spar web 30 is bonded with adhesive 28 to the spar caps 26 to form an I-beam.

Figure 3:
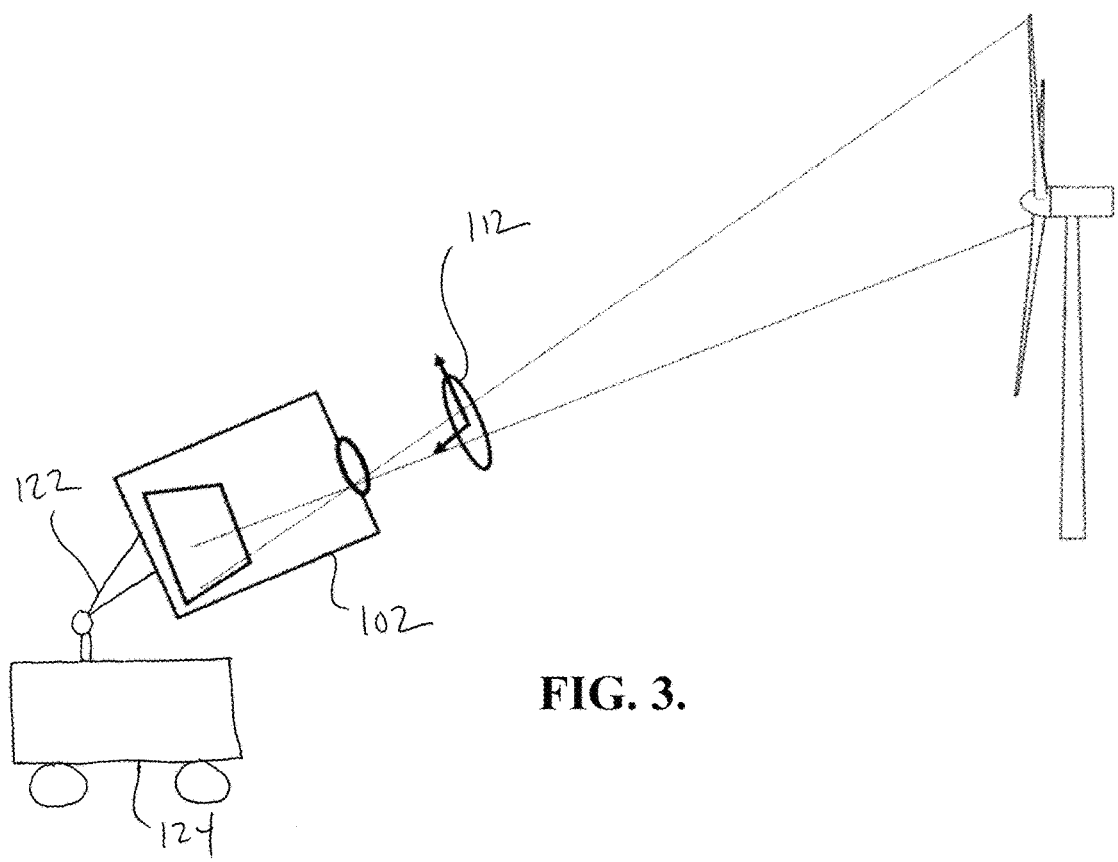
FIG. 3 is a schematic diagram of a first preferred embodiment of the invention using a single camera and polarizer rotated manually or automatically.

The preferred embodiment includes a digital camera with a polarizing filter and an image processing computer. FIG. 3 shows a schematic diagram of a single camera 102 setup with a single rotatable polarizer 112. The camera 102 is preferably mounted on a remotely controlled pan/tilt mechanism 122 located on an outside of a vehicle 124, such as a car, truck, boat, or the like. While a rotatable polarizer 112 is shown, any type of adjustable polarizer filter that allows for variation of the amount of passed light can be used, such as other types of mechanical polarizer filters, adjustable liquid crystal phase retarders, or the like, or combinations thereof.

With the blade stopped, two images of a section of a wind turbine blade are photographed with the polarized filter 112 set at first to reduce the amount of reflected light from the blade then second, to pass the maximum amount of reflected light from the blade. The filter rotation of 90 degrees may be manual or automatic. The resulting images must either be in perfect registration using a tripod (not shown) or a means must be available to align the images into registration with each other. The images are the subtracted or the absolute difference is calculated using the image processing computer. The image may also be further enhanced with a brightness and contrast adjustment to yield a glare-free, very high contrast image revealing even subtle surface waviness, repairs, gel coat defects, blade erosion and surface cracking.

Figure 4:
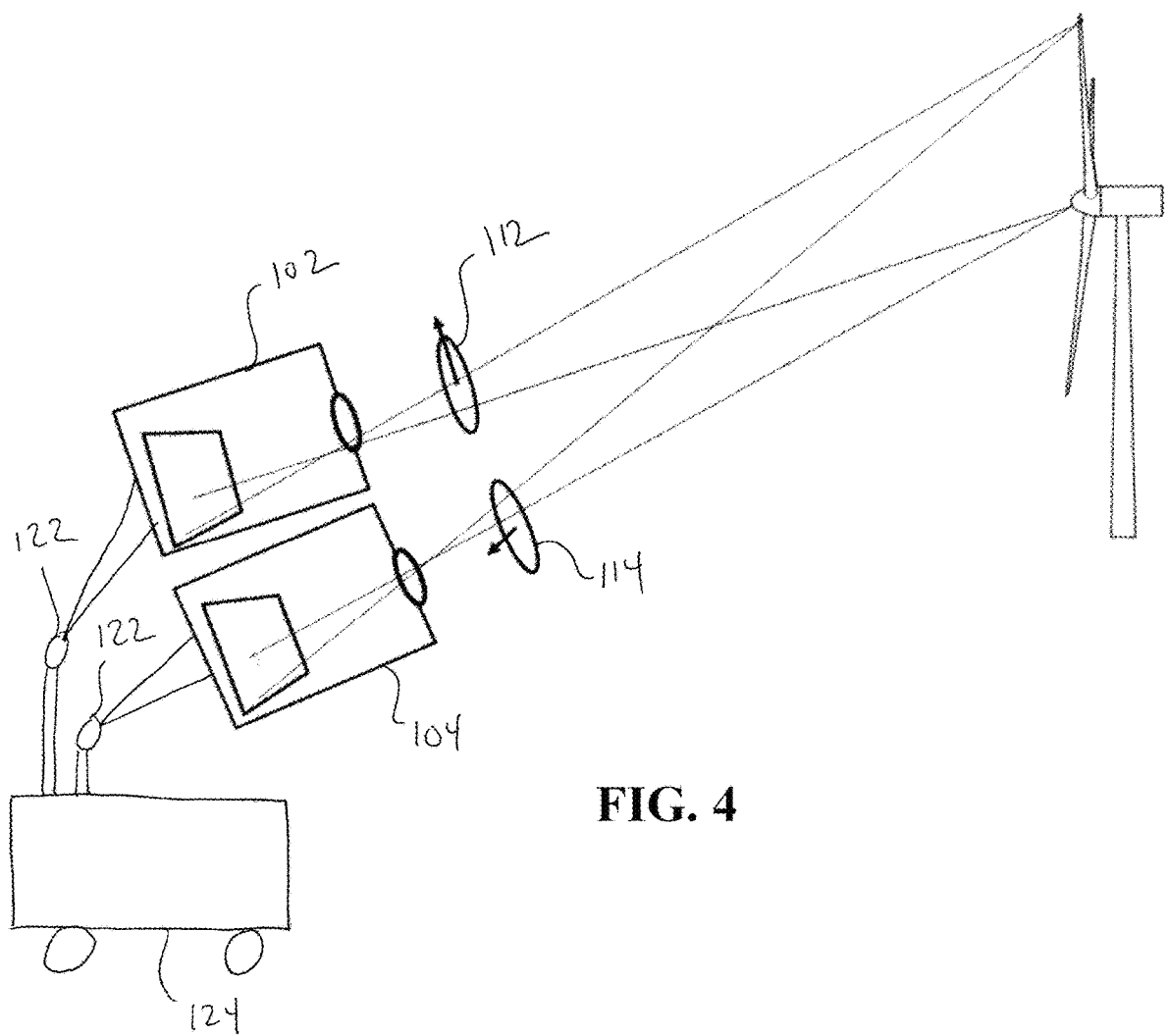
FIG. 4 is a diagram of a second embodiment of the invention using multiple cameras in pairs or singling with fixed or automatic polarization rotation.

As shown in FIG. 4, multiple cameras 102, 104 with fixed or automatic polarizer 112, 114 rotation may be used for stationary blades. For blades in rotation, simultaneity of the exposures is critical to maintain image registration. Both cameras 102, 104 must record the same field of view at the same time. The slight parallax between the two cameras 102, 104 does not significantly degrade the final image.

As with any digital image, pixel counting software may be used to measure features, locations and areas. Digital photography images are formed by focusing electromagnetic energy with a lens onto a flat sensor comprised of energy sensitive elements or pixels positioned in generally a rectangular array, for example 3000 horizontal by 2400 vertical. As with any image of an object, the image scale, measured in pixels per unit distance on the surface of the object, changes continuously over the field of view as the angle θ between the camera lens and the position of each imaged point on the target changes. For a large flat object with the camera pointed straight on, the line from the center of the camera lens to the target is the shortest distance and the image scale will be largest value. As one moves to an edge of the field of view, the angle and distance increase and the image scale decreases.

Objects in the field in a digital image may be measured with respect to other objects of features in the image. First, the digital image must be calibrated by counting the number of pixels in a line segment that crosses and ends at the extremes of a feature of known dimension, located at approximately the same distance from the camera to the feature desired to be measured. The number of pixels counted divided by the feature's known dimension gives the image scale at that location in pixels/unit of measure (ft. or meters). Other features or objects can then be measured by counting pixels for either their length or wide or distance from a known datum, if in the field of view, the dimension being the pixel count divided by the image scale.

For wind turbine generators, one can select a calibration feature in the digital image that changes in apparent width with changes in distance, but does not change if the viewing angle changes, giving a more reliable measurement. One example of such an object is a sphere, whose diameter changes with distance, but not with the viewing angle. A cylinder is another example. The root end of wind turbine blades are cylindrical where they attach to the pitch bearing in the hub. Regardless of the blade pitch or the viewing angle from the ground, the blade root end diameter can be used to calibrate the image scale of a wind turbine blade and then allow measurement of other features at the same approximate distance.

Another area of known dimension could be the diameter of the tower at the base of the nacelle or at a visible weld joint. Due to the increased thickness of steel at the tower joint welds, these joints retain heat from the sun and remain visible with infrared cameras during most of the night, when thermal inspection of wind turbine blades is best due to washout of defects with thermal emissions. The known dimensions at the blade roots or at tower welds may be used to calibrate the image scale.

The imaging of the area of known dimension could be done using digital thermography, photography or any other passive or active imaging technique. Software is then used to determine an image scale in units of pixels/ft., pixels/meter, or any other scale of pixels to length. Pixel counting is then used to determine a dimension calibrated in pixels of the size and/or area of the indication. This will permit the software to comparatively determine the dimensions of other features or objects, such as anomalies, that are located at approximately the same distance. The dimensions of such features or anomalies may then be converted back to a conventional dimensional measurement, such as feet, meters, or other units of length. The imaging software may then integrate dimensional measurements to determine the surface area of the feature or anomaly.

Such imaging may be conducted with the wind turbine blade at multiple radial angles of rotation in order to generate an image scale template that corrects for image distortion over the field of view of the digital image as the wind turbine blade rotates. The imaging may be performed as the wind turbine blade rotates, so it is not necessary to immobilize the wind turbine blade or take the unit off-line during the inspection process. With the blade oriented horizontally, the angle of the arc subtended by a defect indication on the blade in the image is relatively small, so the error in sizing and locating the defect is relatively small. Images where the blade is pointing at angles other than horizontally have an image scale much more distorted by changes in the distance from the IR camera to points on the blade. If the blade is pointing down, the distance from the camera to the blade tip is approximately equal half the height of the tower. The image scale at the blade tip would be twice the value for the image scale at the root and defect measurements would be twice the actual size.

A sequence of digital thermal images or photographs may be played back, frame by frame to allow the analyst the ability to select frames with optimal image quality for the definition of the boundaries of an anomaly. Image measurement tools that measure each pixel value along a line through a defect indication can be programmed to measure the signal to noise ratio, which may be defined as the pixel values for the area adjacent to the defect squared divided by the pixel values for the defect indication squared. Such a tool, among many known to those skilled in the art of image processing, may be used to quantitatively select the image with the best image quality.

The field operator may image the wind turbine blade in position segments in order to capture a sequence of multiple images of all three blades at least once as they pass through the camera field of view. This may be followed by a rotation of the camera on its mount to capture the next blade segment in order to image a sequence of multiple images of all three blades at least once as they pass through the camera field and so forth until images of the entire blade are captured.

Figure 5:
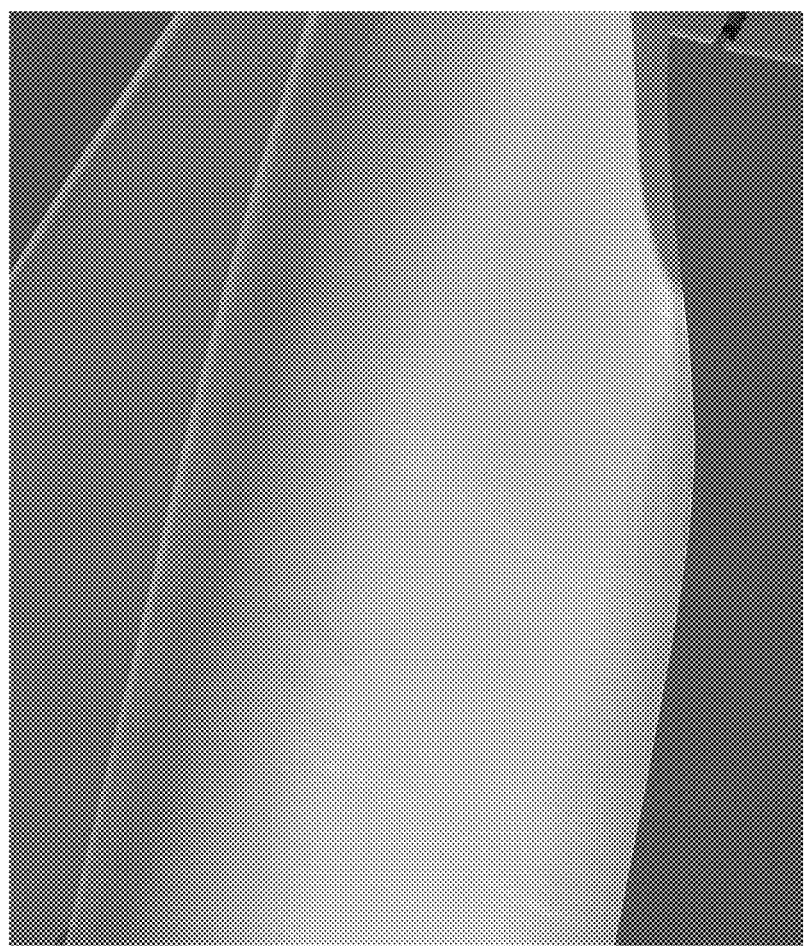
FIG. 5 shows a first image with 0 degrees polarization.

FIG. 5 is a photograph of a wind turbine blade in the polarized solar light with the polarizer set to transmit the minimum light reflected from the blade.

Figure 6:
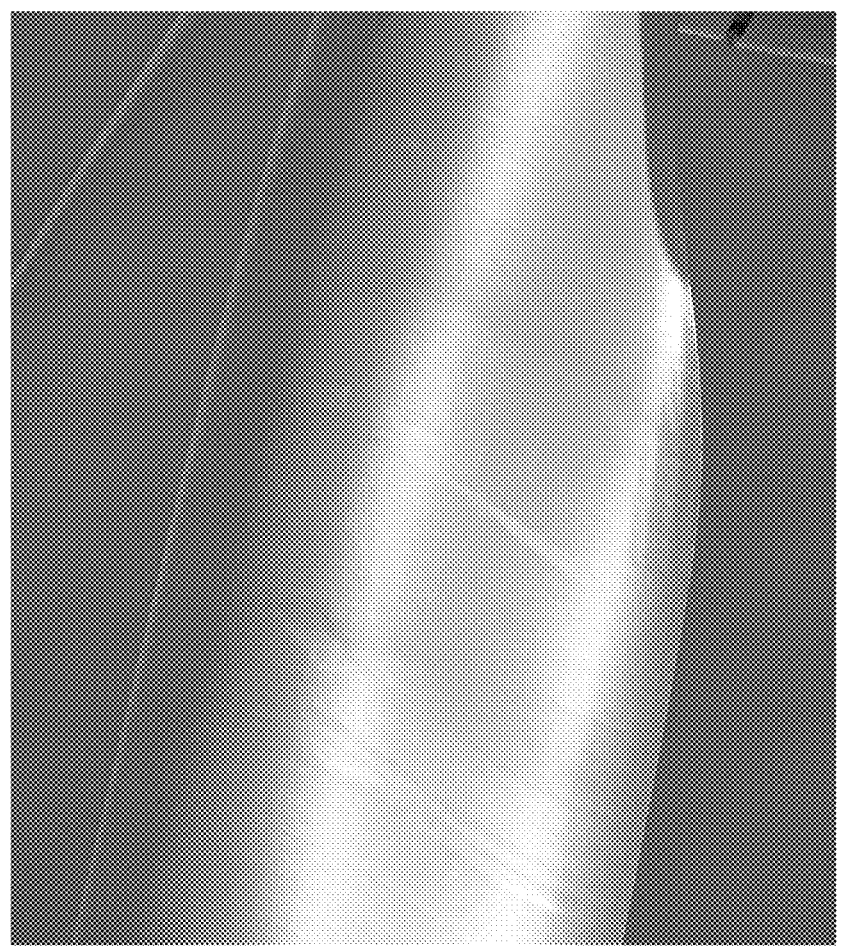
FIG. 6 shows a second image with 90 degrees polarization.

FIG. 6 is a photograph of a wind turbine blade in a polarized solar light with the polarizer set to transmit the maximum rate reflected from the blade.

Figure 7:
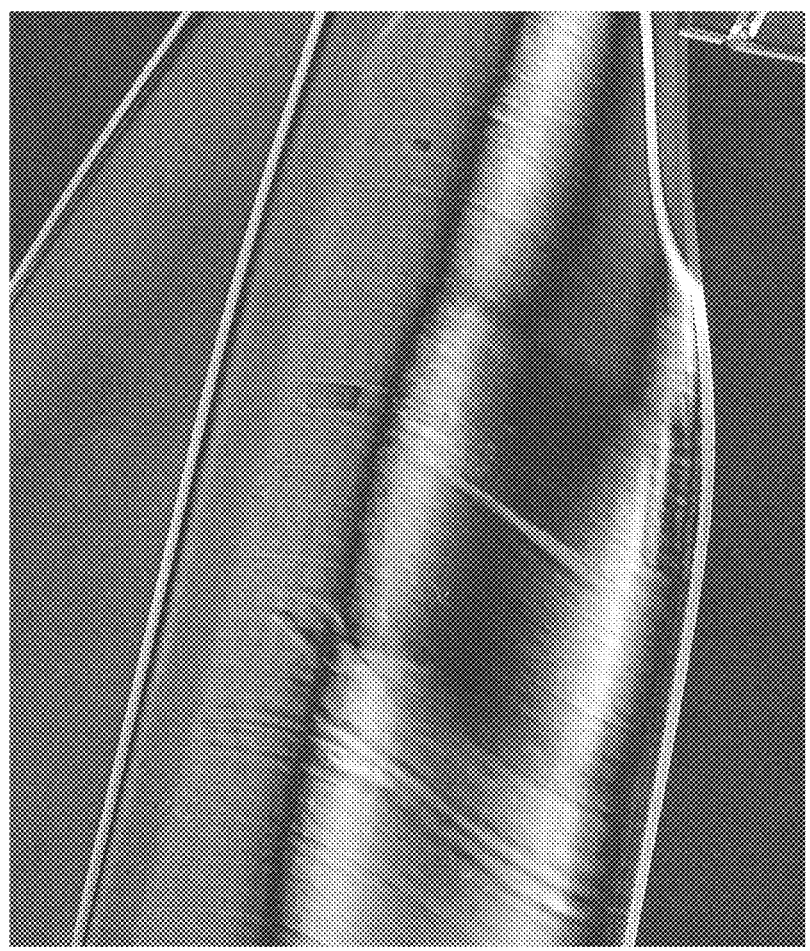
FIG. 7 shows the final image after digital image subtraction and brightness and contrast adjustment.

FIG. 7 is a photograph of a wind turbine blade made by taking the absolute difference images between the blade photographs, as shown in FIG. 5 and FIG. 6, followed by adjusting the brightness. This can be shown as P3=[P1−P2]. Note that this is the absolute value for each pixel in the digital image after the subtraction of the images.

Figure 8:
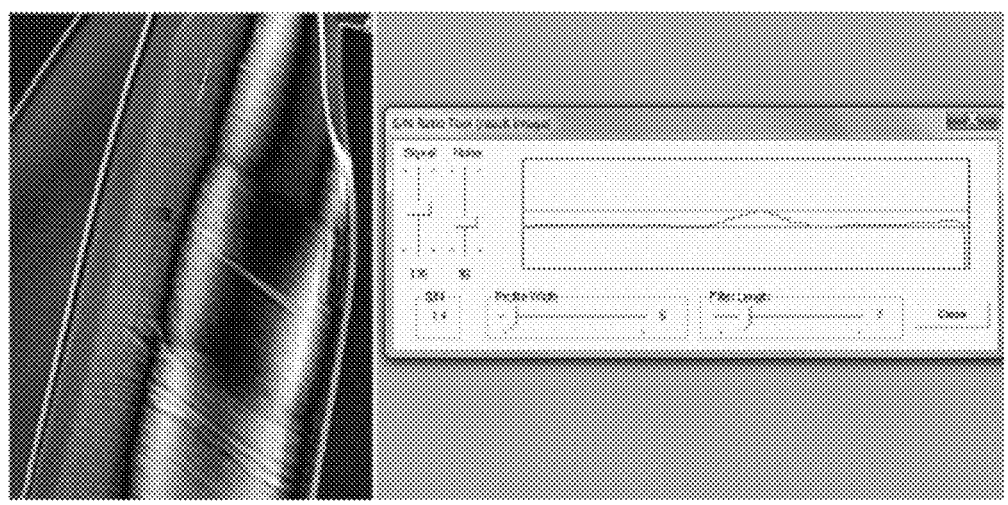
FIG. 8 is photograph of a wind turbine blade after image processing.

FIG. 8 depicts an area on a final high contrast image selected, using a dotted line segment by clicking on one side of the indication in dragging the cursor across the indication. The signal-to-noise ratio is the pixel value of adjacent areas divided by the pixel value of the indication, as shown in FIG. 8. Signal-to-noise ratio is 1.4. Other arithmetic routines may be used so long as each method is defined in the context of use. Another routine to measure the signal to noise ratio is to square the pixel values, prior to the division.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of remotely inspecting a wind turbine blade of a wind turbine in situ, the wind turbine blade being illuminated by solar or artificial light, the method comprising:

acquiring a first image of the wind turbine blade using a digital visible light camera equipped with an adjustable polarizer set to a first condition for passing a first amount of polarized light, the digital visible light camera with the adjustable polarizer located on a portable platform remote from the wind turbine;

subsequently acquiring a second image of the wind turbine blade using the digital visible light camera with the adjustable polarizer set to a second condition for passing a second amount of polarized light, the first amount of polarized light being different than the second amount of polarized light;

in an image processing computer, aligning the first and second images into registration with one another;

defining, in the image processing computer, a calibration feature in a final image, the calibration feature being an object of known dimension which establishes a point of reference in a field of the final image, the calibration feature having an apparent width which changes with changes in a viewing distance while remaining constant through a change in viewing angle; and in the image processing computer, performing image subtraction or calculating an absolute difference of the first and second images to yield the final image of the wind turbine blade.

2. The method of claim 1, further comprising:
obtaining, by the image processing computer, a quantitative measurement of at least one of size, area, or location of one or more anomalies detected in the final image of the wind turbine blade.

3. The method of claim 2, further comprising:
measuring, by the image processing computer, the calibration feature in the image by number of pixels; and
determining, by the image processing computer, an image scale in units of pixels/unit distance, wherein the quantitative measurement of the one or more anomalies is obtained using the image scale.

4. The method of claim 3, wherein the calibration feature is located approximately at a same distance from the camera as one of the one or more anomalies.

5. The method of claim 1, further comprising:
in the image processing computer, performing at least one of a brightness adjustment or a contrast adjustment to the final image of the wind turbine blade.

6. The method of claim 1, wherein the camera and adjustable polarizer are mounted on a remotely controlled pan/tilt mechanism located on an outside of a vehicle.

7. The method of claim 1, wherein the calibration feature is cylindrical.

8. The method of claim 7, wherein the calibration feature is a root of the wind turbine blade.

9. The method of claim 7, wherein the calibration feature is one of a tower diameter at a base of a nacelle or a visible weld joint of the tower.

10. A method of remotely inspecting a wind turbine blade of a wind turbine in situ, the wind turbine blade being illuminated by solar or artificial light, the method comprising:

acquiring a first image of the wind turbine blade using a first digital visible light camera equipped with a first polarizer having a first polarization angle, the first digital visible light camera with the first adjustable polarizer located on a portable platform remote from the wind turbine;

simultaneously acquiring a second image of the wind turbine blade using a second digital visible light camera equipped with a second polarizer having a second polarization angle different from the first polarization angle, the second digital visible light camera with the second adjustable polarizer located on the portable platform remote from the wind turbine;

in an image processing computer, aligning the first and second images into registration with one another;

defining, in the image processing computer, a calibration feature in a final image, the calibration feature being an object of known dimension which establishes a point of reference in a field of the final image, the calibration feature being cylindrical; and in the image processing computer, performing image subtraction or calculating an absolute difference of the first and second images to yield the final image of the wind turbine blade.

11. The method of claim 10, further comprising:
obtaining, by the image processing computer, a quantitative measurement of at least one of size, area, or location of one or more anomalies detected in the final image of the wind turbine blade.

12. The method of claim 11, further comprising:
measuring, by the image processing computer, the calibration feature in the image by number of pixels; and
determining, by the image processing computer, an image scale in units of pixels/unit distance, wherein the quantitative measurement of the one or more anomalies is obtained using the image scale.

13. The method of claim 12, wherein the calibration feature is located approximately at a same distance from the cameras as one of the one or more anomalies.

14. The method of claim 10, wherein the first and second cameras each capture a series of first and second images while the wind turbine blade is rotating so as to yield a series of final images based on the image subtraction or absolute difference calculation performed for each corresponding pair of first and second images.

15. The method of claim 14, further comprising:
obtaining, by the image processing computer, a quantitative measurement of at least one of size, area, or location of one or more anomalies detected in at least one of the series of final images of the wind turbine blade.

16. The method of claim 15, further comprising:
selecting at least two of the final images, wherein the wind turbine blade in each of the selected images is at a different radial angle of rotation;
measuring, by the image processing computer, the calibration feature in each of the at least two selected images by number of pixels; and
generate an image scale template to correct image distortion over the field of view in the final images.

17. The method of claim 10, further comprising:
in the image processing computer, performing at least one of a brightness adjustment or a contrast adjustment to the final image of the wind turbine blade.

18. The method of claim 10, wherein the cameras and corresponding polarizers are mounted on a remotely controlled pan/tilt mechanism located on an outside of a vehicle.

19. The method of claim 10, wherein the calibration feature is a root of the wind turbine blade.

20. The method of claim 10, wherein calibration feature is one of a tower diameter at a base of a nacelle or a visible weld joint of the tower.

* * * * *